(12) United States Patent
Bilac et al.

(10) Patent No.: US 6,297,939 B1
(45) Date of Patent: Oct. 2, 2001

(54) ZONE SELECTIVE INTERLOCK FOR A CIRCUIT BREAKER SYSTEM

(75) Inventors: Mario Bilac, Lawrenceville; Charles Randall Dollar, II, Norcross, both of GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/434,979

(22) Filed: Nov. 5, 1999

(51) Int. Cl.$^7$ ........................................ H02H 3/00
(52) U.S. Cl. .................... 361/64; 361/68; 361/94; 361/97
(58) Field of Search ................. 361/62–69, 94–97; 700/292–293; 702/64

(56) References Cited

U.S. PATENT DOCUMENTS

| | | | |
|---|---|---|---|
| 4,266,259 | * 5/1981 | Howell | 361/97 |
| 4,468,714 | * 8/1984 | Russell | 361/62 |
| 4,631,625 | 12/1986 | Alexander et al. | 361/94 |
| 4,689,708 | * 8/1987 | Hager et al. | 361/65 |
| 4,706,155 | * 11/1987 | Durivage et al. | 361/64 |
| 4,751,605 | 6/1988 | Mertz et al. | 361/91.1 |
| 4,794,484 | * 12/1988 | Matsko et al. | 361/93.3 |
| 4,870,531 | 9/1989 | Danek | 361/93.1 |
| 4,937,757 | * 6/1990 | Dougherty | 700/293 |
| 4,947,126 | 8/1990 | May et al. | 324/509 |
| 5,151,842 | * 9/1992 | DeBaisi et al. | 361/93.2 |
| 5,239,144 | 8/1993 | Robbins et al. | 200/50 R |
| 5,341,268 | * 8/1994 | Ishiguro et al. | 361/62 |
| 5,381,119 | 1/1995 | Robbins et al. | 335/132 |
| 5,426,592 | 6/1995 | Leone et al. | 700/292 |
| 5,617,286 | 4/1997 | Jenkins | 361/93.2 |
| 5,740,027 | 4/1998 | Akers et al. | 363/97 |
| 5,754,386 | 5/1998 | Barbour et al. | 361/154 |
| 5,905,615 | * 5/1999 | Rivetti et al. | 361/63 |
| 5,905,616 | * 5/1999 | Lyke | 361/64 |
| 5,907,467 | 5/1999 | Barbour | 361/170 |
| 5,940,257 | 8/1999 | Zavis | 361/42 |
| 5,982,596 | * 11/1999 | Spencer et al. | 361/64 |

* cited by examiner

Primary Examiner—Michael J. Sherry

(57) ABSTRACT

A circuit breaker system 10 using electronic trip units 35. The electronic trip units 35 are coupled to a communications bus 30 whereby the electronic trip units 35 can be reconfigured, controlled, and/or monitored by a central computer 20. Further, the electronic trip units are coupled to a separate control power supply line 50 and to a zone selective interlock system 70. The zone selective interlock system 70 is configured to provide tripping delays to circuit breakers located upstream from a detected fault.

23 Claims, 5 Drawing Sheets

ZONE SELECTIVE INTERLOCK FOR A CIRCUIT BREAKER SYSTEM

FIELD OF THE INVENTION

The present invention relates generally to electric powered trip units, such as circuit breakers and more particularly to a zone selective interlock system that cooperates with the electronic trip units.

BACKGROUND OF THE INVENTION

In a typical factory-power distribution system, power is generated by a power generation company and supplied to a factory and thereafter distributed around the factory to various equipment such as, for example, motors, welding machinery, computers, heaters, lighting, and the like.

Power distribution systems of this type are typically centrally located in switch gear rooms or substations. From there, power is divided up into branches such that each branch supplies power to a portion of the factory and/or specified loads. Frequently, transformers are disposed throughout the factory to step down the supply voltage to that required by specific pieces of equipment or portions of the factory. Therefore, a factory-power distribution system typically has a number of transformers servicing various types of equipment in various areas. Inherent with this, is the high cost of the power-distribution equipment such as transformers, as well as the cost of the equipment to which power is being supplied. Therefore, it is quite common to provide protective devices such as circuit breakers or fuses in at least each branch so that not only may each piece of equipment be protected but any problems associated with one piece of equipment does not ripple to adjacent or interconnected pieces of equipment. Further, providing fuses or circuit breakers in each branch can help minimize down time since specific loads may be energized or de-energized without affecting other loads thereby creating increased efficiencies, lower operating and manufacturing costs and the like.

Typically, when circuit breakers are utilized, they are used to detect more than just large overcurrent conditions caused by short circuit faults. In addition, they frequently detect lower level long-time overcurrent conditions and excessive ground currents. The simplest form of circuit breakers are thermally tripped as a result of heating caused by overcurrent conditions and, in this regard, are basically mechanical in nature. These mechanical-type breakers are incorporated into almost all circuit breakers, regardless of whether or not additional advanced circuitry is provided since they are extremely reliable over a long life cycle and provide a default trip-type level of protection.

Some types of circuit breakers utilize electronic circuitry to monitor the level of current passing through the branch circuits and to trip the breaker when the current exceeds a pre-defined maximum value. Electronic circuit breakers are adjustable so as to fit a particular load or condition by the end user without designing or specifying different breakers. Breakers of this type typically include a microcontroller coupled to one or more current sensors. The microcontroller continuously monitors the digitized current values using a curve which defines permissible time frames in which both low-level and high-level overcurrent conditions may exist. If an overcurrent condition is maintained for longer than its permissible time frame, the breaker is tripped.

Circuit breakers used in industrial settings and other settings using multiple circuit breakers are often arranged in a tree configuration having a plurality of levels or layers. The top of the tree is close to the power source and the base of the tree is coupled to a plurality of loads. Each circuit breaker at each different layer of the tree is coupled in series with one or more circuit breakers downstream from the power source. Utilizing such a tree configuration provides the difficulty that a circuit breaker multiple levels upstream from a load fault may be tripped when a load fault is detected thereby causing power outage to other loads, which are multiple levels downstream, that should otherwise be unaffected.

Therefore, there is a need for a system which selectively chooses which circuit breakers should be opened or tripped when a load fault or short circuit condition is detected. Also, there is a need for a circuit breaker system that allows for time delays in circuit breakers that are upstream from a load fault such that only those circuit breakers that are necessary to protect machinery coupled to the power distribution system will be tripped or opened.

SUMMARY OF THE INVENTION

One embodiment of the invention relates to a circuit breaker system. The circuit breaker system includes a plurality of circuit breakers, arranged in layers, each layer being coupled to the next layer in series and at least some of the circuit breakers including an interlock interface. The interlock interface selectively controls tripping of the circuit breaker that is coupled to the series circuit and is in the layer closest to a fault and meets a fault condition. The interlock interface selectively controls maintaining circuit breakers, coupled to the series circuit that are not in layers closest to the fault, in a closed state.

Another embodiment of the invention relates to an interlock interface configured to be coupled to a circuit having a plurality of circuit breakers arranged in layers, one layer being coupled in series to another layer. A first connection is configured to be coupled to a circuit breaker. An output is configured to provide an interlock signal. A first input is configured to be coupled to the output of another interlock interface on a different layer, and a second input is configured to be coupled to the output of another interlock interface on the same layer. The output provides an interlock signal if one of the following conditions occurs: the circuit breaker associated with the output detects a fault; the second input receives an interlock signal from another interlock interface; and the first input receives an interlock signal from another interlock interface. The interlock interfaces receiving interlock signals perform tripping delays.

Still another embodiment of the invention relates to a method of controlling a plurality of circuit breakers. The plurality of circuit breakers are arranged in layers, each layer being coupled to subsequent layers in series and the circuit breakers furthest downstream being coupled to a load. The method includes detecting a fault in a first circuit breaker that is coupled to a load. The method also includes delaying tripping the first circuit breaker until after a predetermined time has elapsed. Further, the method includes providing an interlock signal to any other interlock interfaces on the same layer as the first circuit breaker; and providing an interlock signal to interlock interfaces on the next upstream layer. Further still, the method includes delaying tripping a second circuit breaker on the next upstream layer until after a predetermined time has elapsed.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
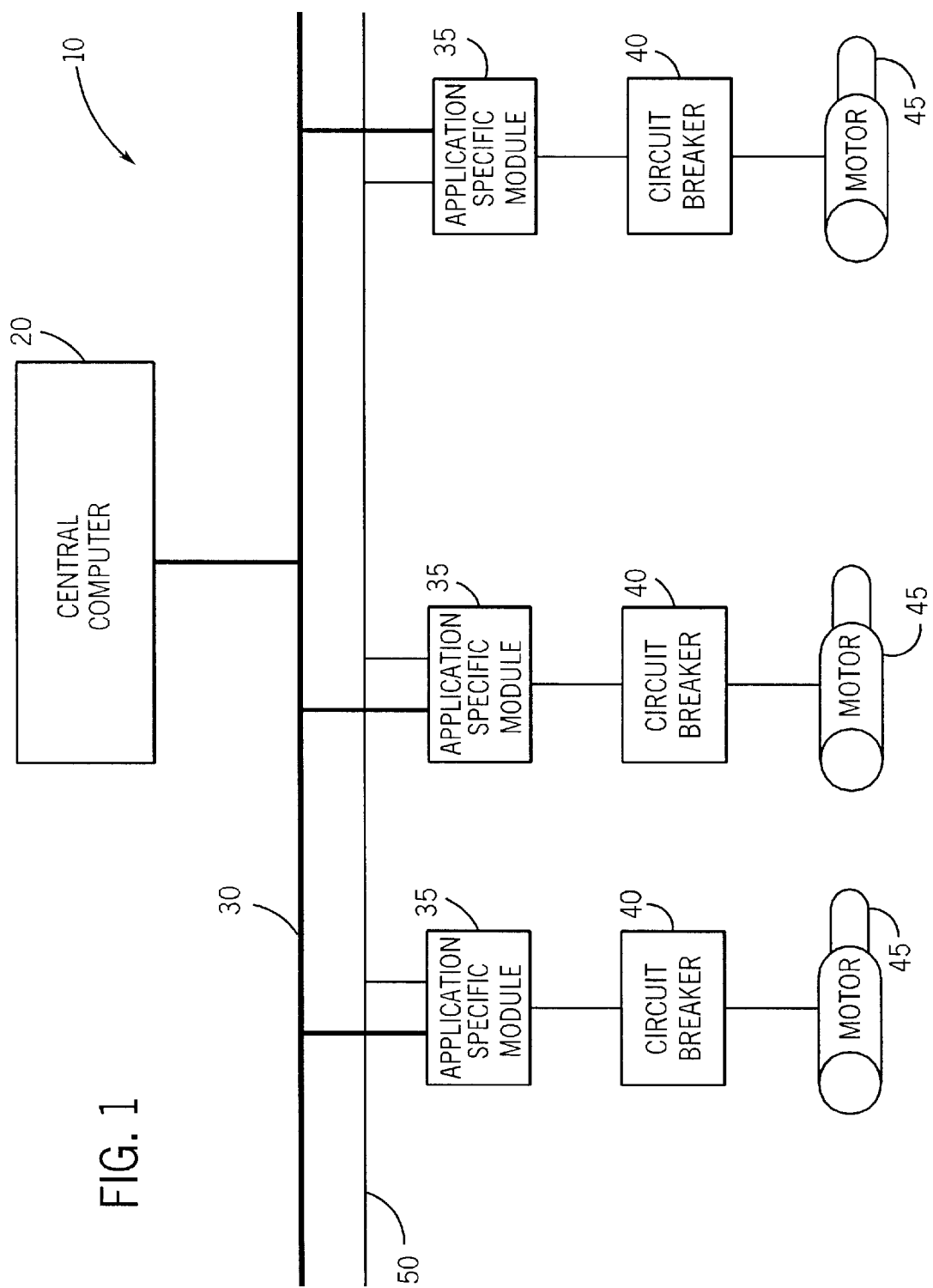
FIG. 1 is a block diagram of a circuit breaker communication, monitoring, and control system.

Referring now to FIG. 1, a block diagram of a preferred embodiment of a circuit breaker communication, monitoring and control system 10 is depicted. System 10 includes a central computer 20 which may be any type of centralized data processing unit including, but not limited to a personal computer, a work station, a computer server, or a dedicated data processing device. Central computer 20 is coupled to a communications bus 30. Communications bus 30 may be any of a wide array of standard communications bus architectures including, but not limited to, Ethernet, RS-485, fiber optic architectures, or other applicable bus architectures. Communications bus 30 may use any of a number of applicable communications protocols including, but not limited to profibus, profibus DP, TCP/IP, or any other applicable communications protocol.

Communications bus 30 is coupled to and in communication with a plurality of application specific modules 35 which are interfacing devices between communications bus 30 and a circuit breaker 40. Circuit breaker 40 is coupled to a load such as motors 45. In a preferred embodiment, circuit breaker 40 may be a Molded Case Circuit Breaker (MCCB), but alternatively circuit breaker may be any type of applicable circuit breaker. Circuit breaker 40 may be coupled to any of a variety of load types including, but not limited to, motors 45, welders, computers, heaters, lights, or any other type of electrical equipment.

Circuit breaker 40 is configured to interrupt current flow to motor 45 or any applicable load when any of a variety of overload conditions are detected. The circuit breaker may be tripped either by a short circuit condition, or by electronically sensing an overload condition, the overload condition being preprogrammed into the circuit breaker electronics. Trip types may include, but are not limited to, overload trips, short time trips, ground fault trips, and instantaneous trips.

Figure 2:
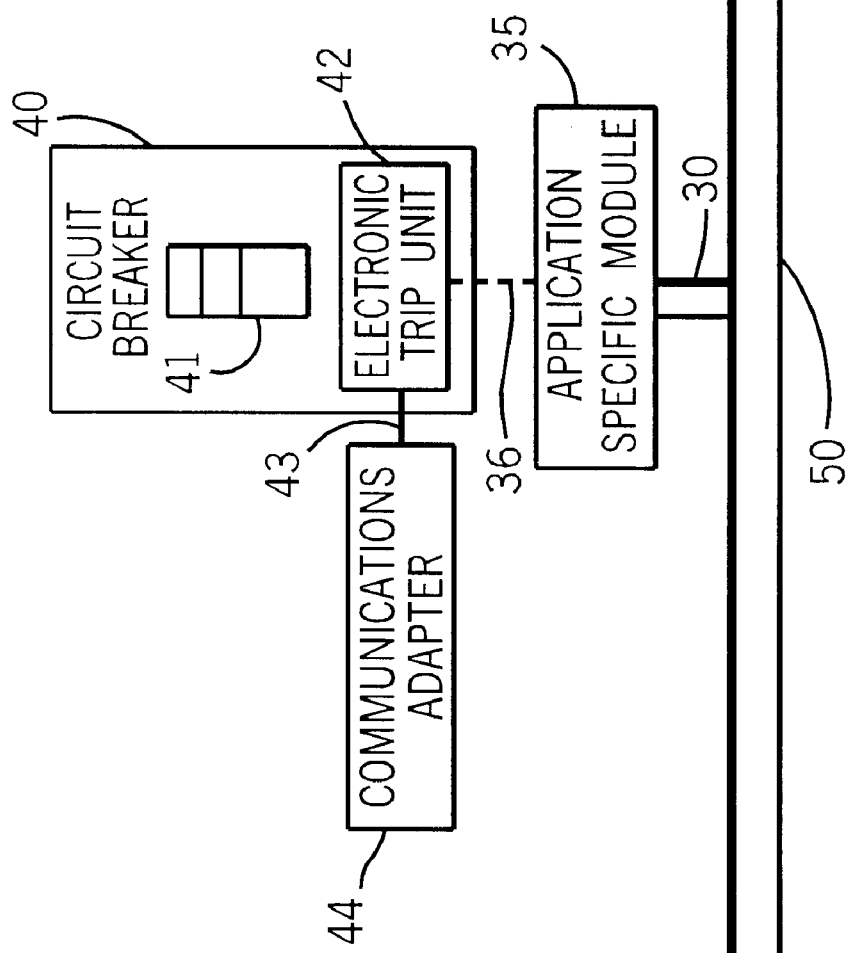
FIG. 2 is a block diagram of a circuit breaker having an application specific module in communication with an external communications bus.

Referring now to FIG. 2, circuit breaker 40 is depicted as having a circuit breaker handle 41 for manual tripping or resetting of circuit breaker 40. Further, circuit breaker 40 has an electronic trip unit 42, which in a preferred embodiment includes a liquid crystal display (LCD) readout or may include any type of display. Electronic trip unit 42 may be programmed to cause current interruption when any of a variety of overload conditions is sensed by the electronic trip unit. For example, electronic trip unit 42 may be programmed to interrupt current when a specified root means square (RMS) current value is reached. Further, other types of overload conditions may be specified. Further still, electronic trip unit 42 may be programmed to trip after a specified load condition is reached and after a specified time delay.

Figure 3:
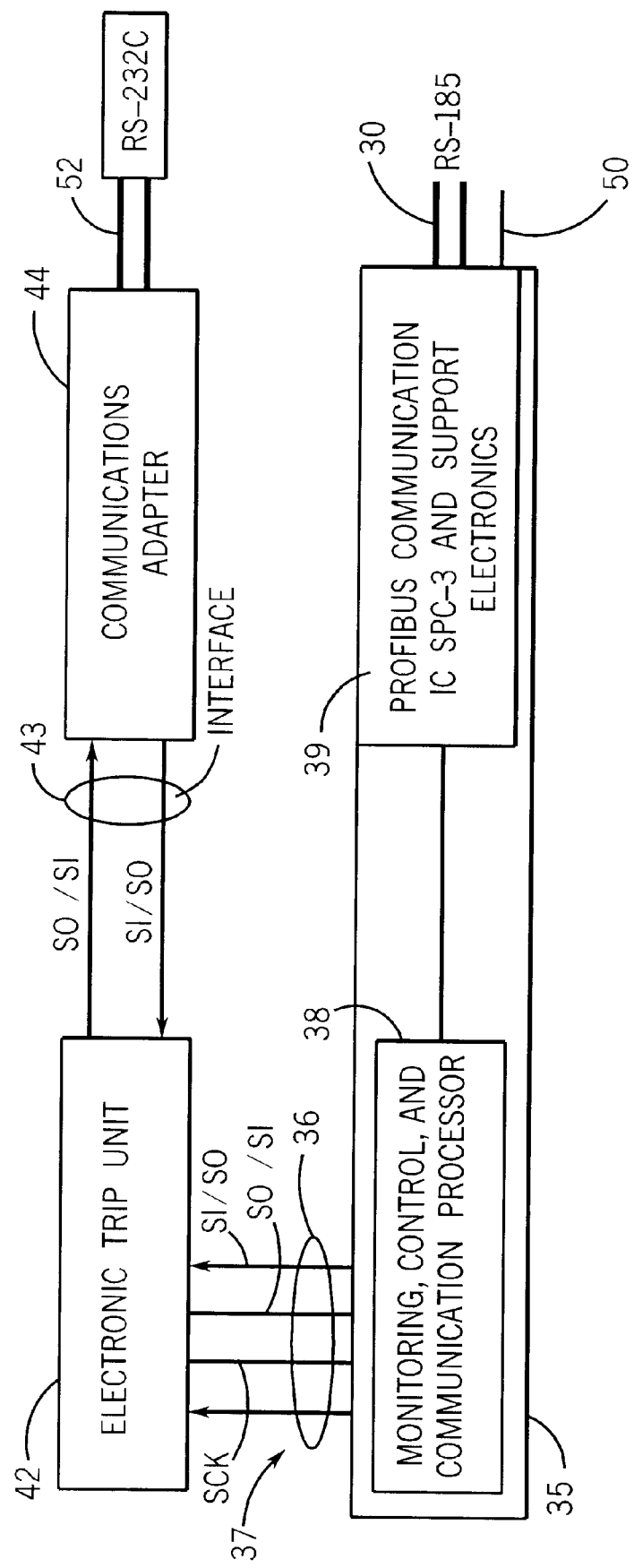
FIG. 3 is a block diagram of the circuit breaker of FIG. 2 showing the communication lines in more detail.

In a preferred embodiment, electronic trip unit 42 includes an interface 43 for a communications adapter 44. Communications adapter 44 may be coupled to a personal computer, or other data processing device or further may be coupled to any of a variety of communications buses or communication devices. Communications adapter 44 allows an attached communications or data processing device to download information from electronic trip unit 42 or alternatively allows communication with electronic trip unit 42 to program electronic trip unit 42 for any of a variety of internal settings. Interface 43 between electronic trip unit 42 and communications adapter 44 may be any of a variety of serial output/serial input (SO/SI), serial input/serial output (SI/SO) communications lines 43, as depicted in FIG. 3. Further, communications adapter 44 preferably uses a serial interface 52, such as serial interface RS-232C as depicted in FIG. 3. Interface 43 and interface 52 are not limited to serial interfaces of the type shown, interfaces 43 and 52 may be any of a variety of applicable communications interfaces including Ethernet, parallel interfaces, or any other applicable interfaces.

Referring again to FIG. 2, electronic trip unit 42 is coupled to application specific module 35 through a communications line 36. In a preferred embodiment, communications line 36 may be a three meter cable which is a serial communications interface as depicted in FIG. 3. Serial communications interface 36 may include a plurality of communications lines such as serial input/serial output (SI/SO) line, serial output/serial input (SO/SI) line, serial clock (SCK) line and auxiliary power and signals line 37. Auxiliary power and signals line 37 is configured to carry power from ASM 35 to electronic trip unit 42.

As depicted in FIG. 3, serial communication interface 36 is coupled to a monitoring, control, and communication processor 38 of ASM 35. The monitoring, control, and communication processor 38 carries out monitoring, control, and communication functions for ASM 35. The functions include communicating information to and from electronic trip unit 42, transmitting and receiving data from electronic trip unit 42, including information such as, but not limited to, the type of trip encountered, the time of trip, the current values at time of trip, (for example, a trip log). Further, monitoring, control, and communications processor 38 may provide programming information to electronic trip unit 42, such as resetting trip values for electronic trip unit 42 and further may be used to receive real-time data from electronic trip unit 42. Monitoring, control, and communication processor 38 is coupled to a communications module 39 of ASM 35 which may be, in a preferred embodiment, a profibus communications IC SPC-3 communications device and required support electronics.

ASM 35 is coupled to a communications bus 30, such as the RS-485 communications bus depicted in FIG. 3.

To provide functioning of electronic trip unit 42 after a trip or current interruption has occurred, electronic trip unit 42 receives external power through a power line 50 that is coupled to ASM 35. ASM 35 supplies power to electronic trip unit 42 through line 37 depicted in FIG. 3. Power line 50 may also supply zone select interlock (ZSI) signals to ASM 35. Power line 50 further powers ASM 35. In a preferred embodiment, ASM 35 is powered by a 24 volt line 50.

A zone selective interlock signal communicated along line 50 allows breakers that are downstream from a particular breaker to be tripped without tripping upstream breakers. This functionality allows an overload condition to be sensed and interrupted without interruption of the entire system. For example, in an industrial setting it would not be desirable to shut down an entire factory system because a single load device fails thereby tripping a single circuit breaker.

Figure 4:
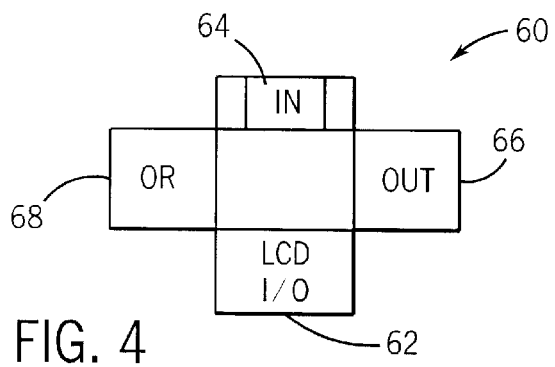
FIG. 4 is a block diagram of a zone selective interlock connection device.

Referring now to FIG. 4, a preferred embodiment of a zone selective interlock connection device 60 is depicted. ZSI connection device 60 may be configured to be coupled to ASM 35 through LCD I/O connection 62. Signals going to and coming from ASM 35 are provided to ZSI connection device 60 through connection 62. Referring again to FIG. 3, ZSI signals are communicated to electronic trip unit 42 over line 37. Referring again to FIG. 4, ZSI connection device 60 also has an input connection 64, an output connection 66, and a logical OR connection 68.

Figure 5:
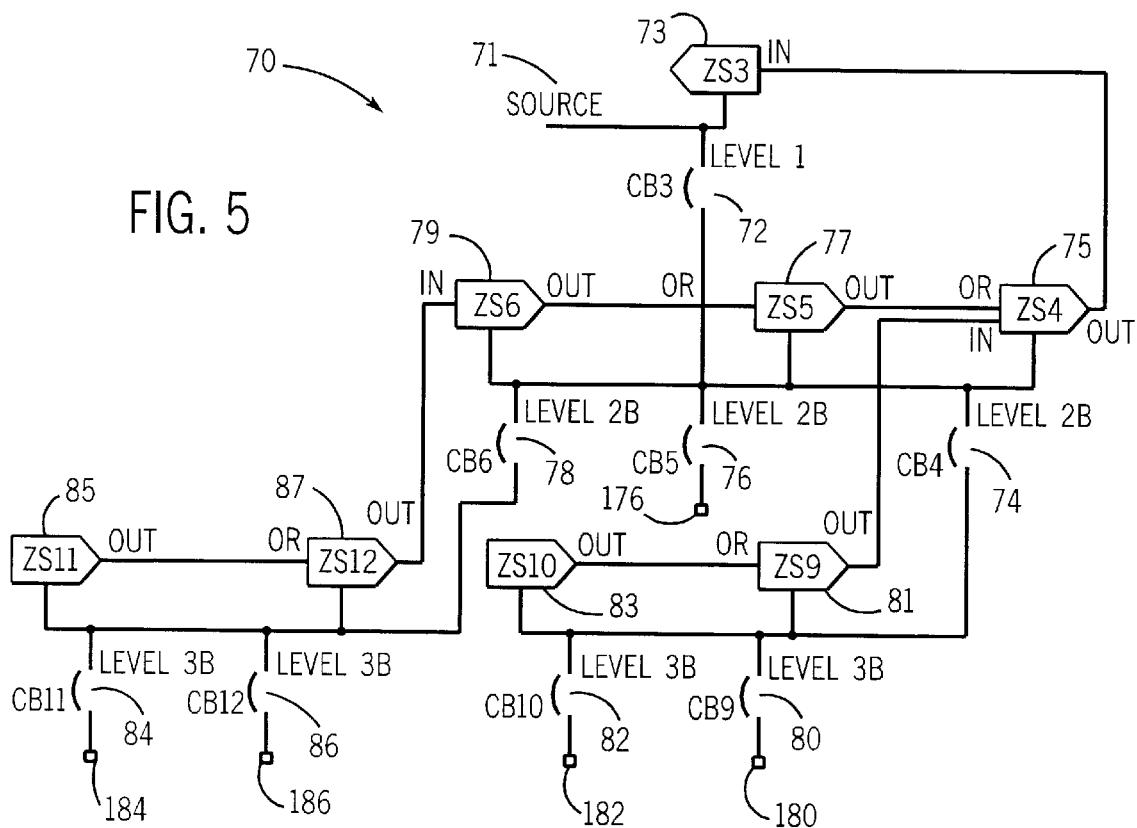
FIG. 5 is a schematic representation of a zone selective interlock system.

Referring now to FIG. 5, a zone selective interlock wiring scheme 70 is depicted. As shown, the circuit breakers are arranged on a power distribution system in a tree arrangement having a plurality of levels or layers (as shown in the diagram there are three levels or layers) the circuit breaker 3 (CB3) 72 is on level one and receives incoming power from a power source 71. A zone selective interlock device 73 is coupled to CB3 72.

On level 2, CB4 74, CB5 76 and CB6 78 are coupled to ZSI connection devices 75, 77, and 79 respectively. A load 176 is coupled to CB5 76. The output of CB4 is coupled to CB9 80 and CB10 82, on level 3 that are coupled to ZSI connection devices 81 and 83 respectively. CB9 80 and CB10 82 have loads 180 and 182 respectively. The output of CB6 78 is coupled to CB11 84 and CB12 86 which are coupled to ZSI connection devices 85 and 87 respectively. CB11 84 and CB12 86 have loads 184 and 186 respectively. CB9 80, CB10 82, CB11 84 and CB12 86 are all located on level 3.

In operation, for example, CB11 may sense a fault on load 184. When CB11 84 detects a fault in load 184, CB11 84 goes into a "pickup" mode. In a "pickup" mode, CB11 84 accumulates further data and waits for a predetermined amount of time before it trips CB11 84. In a preferred embodiment, the predetermined time is a factory-set time or a minimum trip time. While CB11 84 is in "pickup" mode, ZSI connection device 85 outputs a ZSI signal on its output line. In the exemplary wiring scheme depicted, the output line of ZSI connection device 85 is coupled to the logical OR input of ZSI connection device 87. Logical OR inputs are configured to be coupled to other ZSI connection devices on the same level or layer. A ZSI signal received by ZSI connection device 87 is simply passed on to the output of ZSI connection device 87. CB12 86 remains unaffected because ZSI system 70 is configured such that CB12 86 is not opened as it will not help in correcting the fault detected on CB11 84. Therefore, ZSI connection device 87 simply passes the ZSI signal on to ZSI connection device 79 in level or layer 2.

Because ZSI connection device 79 is in a different layer than ZSI connection device 87, the output of ZSI connection device 87 is coupled to the input connection of ZSI connection device 79. Because CB6 78 is the source for load 184, opening CB6 78 would correct the fault and would effectively shut off the load connected to CB12 86 as well. This is not a preferable situation as many loads would be shut off due to a simple fault in a single load. However, the option should still remain to open CB6 78 if opening CB11 84 does not clear the overload condition. Therefore, when ZSI connection device 79 receives the ZSI signal a predetermined delay is put into the opening of CB6 78. In a preferred embodiment, the delay corresponds to a customer programmed delay therefore CB6 78 is configured to wait for CB11 84 to be opened and then determine whether the fault has been cleared.

The ZSI signal received by ZSI connection device 79 is passed on to the logical OR inputs of ZSI connection devices 77 and 75 where they are simply passed to the next level to the input of ZSI connection device 73. Again, CB3 72 receives a ZSI signal and therefore uses, in a preferred embodiment, a customer programmed delay before opening CB3. The customer programmed delay is configured to wait for the opening of CB11 to determine whether the fault has been cleared. If the fault has not been cleared CB3 72 is configured to have a delay that waits for CB6 78 to be opened and further to determine whether the fault has been cleared. If the fault is cleared, CB3 72 may remain closed. However, after the customer programmed delay has passed and the fault has not cleared CB3 72 will be opened.

Figure 6:
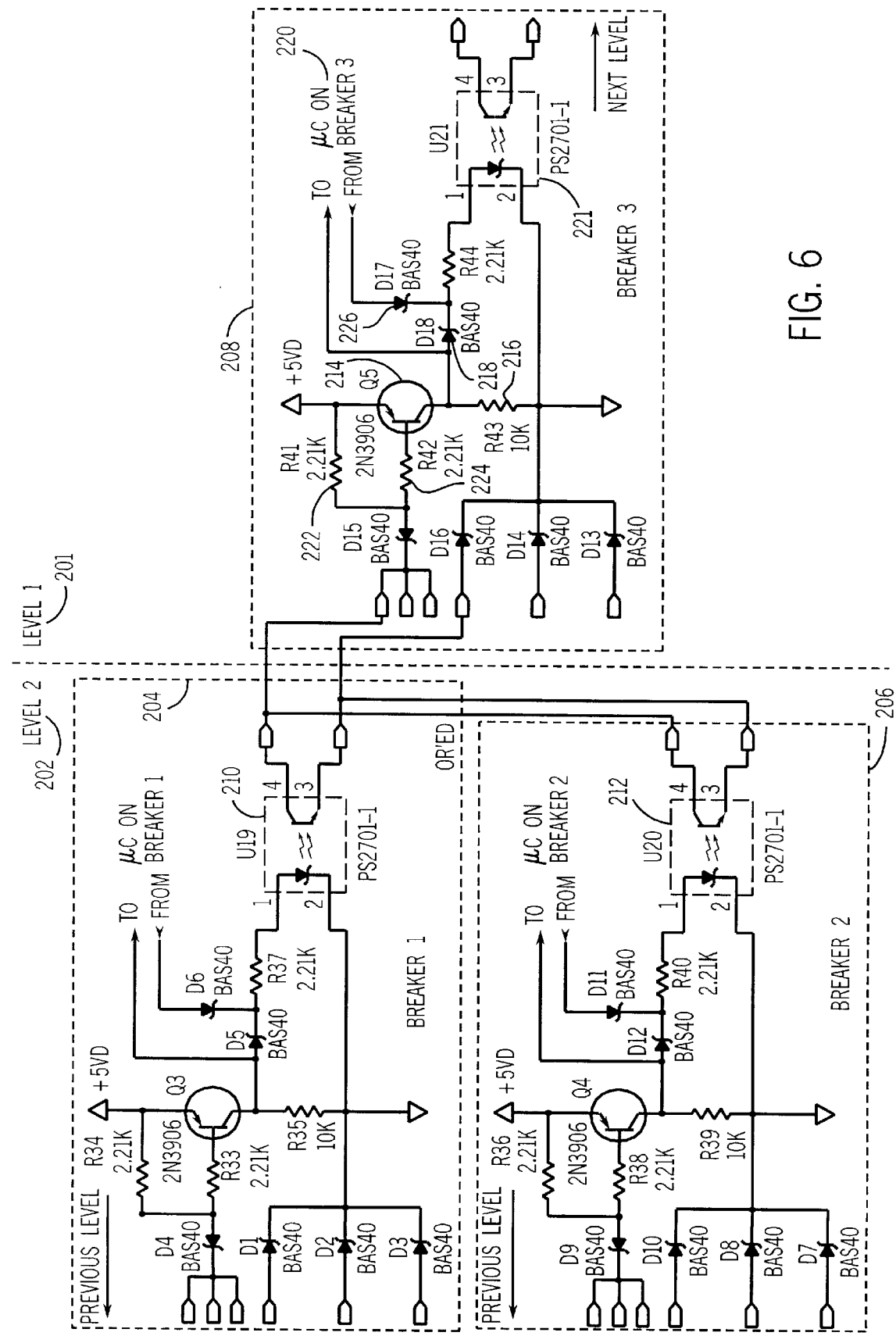
FIG. 6 is a schematic representation of two levels of a zone selective interlock system.

Referring now to FIG. 6, circuitry is shown for two circuit breaker levels, a first level 201 and a second level 202. On second level 202 are circuit breaker 1 204 and circuit breaker 2 206. On first level 201 is circuit breaker 3 208. Each of circuit breakers 204, 206 and 208 are identical circuit breakers as shown. However, it is not required that all of circuit breakers 204, 206 and 208 be identical circuit breakers.

In operation, if breaker 3 208 is to be activated by a level 2 202 breaker the output of either optocoupler U19 210 or optocoupler U20 212 must be in the conductive state. When the output of coupler U19 210, for example, conducts, then transistor Q5 214 is biased in the on state and therefore conducts. Having transistor 214 in the on state results in current flow through resistor R43 216 thereby creating an acceptable logic high level at the anode of diode D18 218. The logic high level signal is connected to a microprocessor of breaker 3 220 which activates the pre-programmed delay feature in a trip curve algorithm within breaker 3 208, when the logic high level is detected. The delay feature is activated regardless of the overload status of breaker 3 208. The logic high signal at the anode of D18 218 also causes D18 itself to conduct and activate the optocoupler U21 221, thereby causing the output of U21 221 to conduct and perpetuate the ZSI signal to the next level in the system.

When the output of either optocoupler U19 210 or U20 212 does not conduct, resistors R41 222 or R42 224 are used to bias Q5 214 in the off, in other words non-conductive, state. Resistor R42 224 is also used to limit the base current of transistor Q5 214.

The ZSI signal may also be generated from within breaker 3 208, for example. This occurs when breaker 3 208 is in an overload condition. In this case, the microcontroller of breaker 3 220 issues a logic high level to the anode of diode D17 226. This signal is blocked away from the micocontroller input by diode D18 218 so that the device can not initiate its own delay feature. The logic high level then conducts through diode D17 226 and activates the optocoupler U21 221 to conduct and perpetuate the ZSI signal to the next level in the system.

Circuit breakers of the type commonly associated with circuit breaker 40 are typically low voltage circuit breakers in the range of 600 volts or less, but the communication and control system discussed above may be configured to operate with circuit breakers of any rated voltage. Further, circuit breakers commonly associated with circuit breakers 40 have current ratings from approximately 63 amps up to 1600 amps, however, other rated currents may also be applied. Further, circuit breakers of the type commonly associated with circuit breaker 40 are three phase circuit breakers which may be three pole or two pole circuit breakers however single phase circuit breakers may also be used.

Those who have skill in the art will recognize that the present invention is applicable with many different hardware configurations, software architectures, communications protocols, and organizations or processes.

While the detailed drawings, specific examples, and particular formulations given describe preferred embodiments, they serve the purpose of illustration only. The materials and configurations shown and described may differ depending on the chosen performance characteristics and physical characteristics of the communication network. For example, the type of communication network or communication protocols used may differ. The systems shown and described are not limited to the precise details and conditions disclosed. Furthermore, other substitutions, modifications, changes, and omissions may be made in the design, operating conditions, and arrangement of the preferred embodiments without departing from the spirit of the invention as expressed in the appended claims.

What is claimed is:

1. A circuit breaker system, comprising:
    a plurality of circuit breakers, arranged in layers, each layer being coupled to the next layer in series; and
    at least some of the circuit breakers including an interlock interface, the interlock interface further including,
        a first connection configured to be coupled to at least one of the circuit breakers,
        an output configured to provide an interlock signal,
        a first input configured to be coupled to the output of another interlock interface on a different layer, and
        a second input configured to be coupled to the output of another interlock interface on the same layer; and
    wherein the interlock interface selectively controls tripping of the circuit breaker that is coupled to the series circuit and is in the layer closest to a fault and meets a fault condition and the interlock interface selectively controls maintaining circuit breakers, coupled to the series circuit that are not in layers closest to the fault, in a closed state.

2. The circuit breaker system of claim 1 wherein the interlock interface causes a delay in the tripping of the associated circuit breaker until after a predetermined time period has elapsed.

3. The circuit breaker system of claim 2 wherein the predetermined time period is a factory set time period for circuit breakers in layers that are closest to the fault.

4. The circuit breaker system of claim 3 wherein the predetermined time period is a customer set time period for circuit breakers in layers that are not closest to the fault.

5. The circuit breaker of claim 2 wherein the interlock interface includes a transistor to activate the delay.

6. The circuit breaker of claim 5 wherein the interlock interface includes a diode to prevent a circuit breaker sensing a fault from applying the delay.

7. The circuit breaker system of claim 1 wherein the output provides an interlock signal if one of the following conditions occurs: the circuit breaker associated with the output detects a fault, the second input receives an interlock signal from another interlock interface, and the first input receives an interlock signal from another interlock interface, and wherein the interlock interfaces receiving interlock signals perform tripping delays.

8. The circuit breaker system of claim 1 wherein the plurality of circuit breakers are molded case circuit breakers.

9. The circuit breaker system of claim 1 wherein the interlock interface is incorporated into an application specific module.

10. An interlock interface configured to be coupled to a circuit having a plurality of circuit breakers arranged in layers, one layer being coupled in series to another layer, comprising:
    a first connection configured to be coupled to a circuit breaker;
    an output configured to provide an interlock signal;
    a first input configured to be coupled to the output of another interlock interface on a different layer; and
    a second input configured to be coupled to the output of another interlock interface on the same layer,
    wherein the output provides an interlock signal if one of the following conditions occurs; the circuit breaker associated with the output detects a fault, the second input receives an interlock signal from another interlock interface, and the first input receives an interlock signal from another interlock interface, and wherein the interlock interfaces receiving interlock signals perform tripping delays.

11. The interlock interface of claim 10 wherein the interlock interface causes a delay in the tripping of the associated circuit breaker until after a predetermined time period has elapsed.

12. The interlock interface of claim 11 wherein the predetermined time period is a factory set time period for circuit breakers in layers that are closest to the fault.

13. The interlock interface of claim 12 wherein the predetermined time period is a customer set time period for circuit breakers in layers that are not closest to the fault.

14. The interlock interface of claim 11 wherein the interlock interface includes a transistor to activate the delay.

15. The interlock interface of claim 14 wherein the interlock interface includes a diode to prevent a circuit breaker sensing a fault from applying the delay.

16. The interlock interface of claim 10 wherein the interlock interface performs a logical OR function between signals provided on the first connection and the second output.

17. The interlock interface of claim 10 wherein the first connection is configured to be coupled to an electronic trip unit.

18. The interlock interface of claim 10 wherein the first connection is configured to be coupled to a molded case circuit breaker.

19. A method of controlling a plurality of circuit breakers, at least some of the circuit breakers including an interlock interface, the plurality of circuit breakers being arranged in layers, each layer being coupled to subsequent layers in series and the circuit breakers furthest downstream being coupled to a load, the method comprising:
    detecting a fault in a first circuit breaker that is coupled to a load;
    delaying tripping the first circuit breaker until after a predetermined time has elapsed;
    providing an interlock signal to any other interlock interfaces on the same layer as the first circuit breaker;
    providing an interlock signal to interlock interfaces on the next upstream layer;
    delaying tripping a second circuit breaker on the next upstream layer until after a predetermined time has elapsed.

20. The method of claim 19 wherein the predetermined time associated with the first circuit breaker is a factory set time.

21. The method of claim 19 wherein the predetermined time associated with the second circuit breaker is a customer set time.

22. The method of claim 19 wherein each interlock interface has at least two inputs and an output.

23. The method of claim 19 wherein each interlock interface is incorporated into an application specific module.

* * * * *